United States Patent [19]

Ashida et al.

[11] Patent Number: 4,514,525
[45] Date of Patent: Apr. 30, 1985

[54] PROCESS FOR PREPARING SMOKE-RETARDANT POLYISOCYANURATE FOAM

[75] Inventors: Kaneyoshi Ashida, Chofu; Masaaki Ohtani, Kawasaki; Shoichi Ohkubo, Yokohama, all of Japan

[73] Assignee: Mitsubishi Chemical Industries, Limited, Tokyo, Japan

[21] Appl. No.: 665,527

[22] Filed: Mar. 10, 1976

[30] Foreign Application Priority Data

Mar. 13, 1975 [JP] Japan .................................. 50-30601

[51] Int. Cl.$^3$ ............................................. C08G 18/14
[52] U.S. Cl. ..................................... 521/112; 521/902
[58] Field of Search ................. 260/2.5 AW, 2.5 AH, 260/2.5 AM; 521/112, 902

[56] References Cited

U.S. PATENT DOCUMENTS

| | | | |
|---|---|---|---|
| 2,834,748 | 5/1958 | Bailey et al. | 528/29 |
| 2,917,480 | 12/1959 | Bailey et al. | 528/27 |
| 3,634,345 | 1/1972 | Diehr et al. | 260/2.5 AW |
| 3,799,896 | 3/1974 | Moss | 260/2.5 AW |
| 3,872,035 | 3/1975 | Papa et al. | 260/2.5 AW |
| 3,940,517 | 2/1976 | DeLeon | 260/2.5 AW |
| 3,981,828 | 9/1976 | Demou et al. | 260/2.5 AW |
| 3,981,829 | 9/1976 | Cenker et al. | 260/2.5 AW |

FOREIGN PATENT DOCUMENTS

| | | | |
|---|---|---|---|
| 1184080 | 12/1964 | Fed. Rep. of Germany | 260/77.5 AP |
| 1374574 | 8/1964 | France | 260/77.5 AP |
| 4591 | 2/1971 | Japan . | |
| 101497 | 12/1973 | Japan . | |
| 1006784 | 10/1965 | United Kingdom | 260/77.5 AP |
| 262392 | 5/1970 | U.S.S.R. | 260/77.5 AP |

*Primary Examiner*—Maurice J. Welsh
*Attorney, Agent, or Firm*—Oblon, Fisher, Spivak, McClelland & Maier

[57] ABSTRACT

In a process for preparing a smoke-retardant polyisocyanurate foam by reacting an organic polyisocyanate in the presence of a blowing agent and an isocyanate-trimerization catalyst, the improvement comprising conducting the reaction by adding 0.5 to 6 wt. % as Si to the total components of the foam of an organosilicone surfactant having a Si content of 4-22%, and selected from an organopolysiloxane-poly-oxyalkylene copolymer, polyvinylsilane having polyoxyalkylene side chain or modified products thereof wherein the mole % of the ethylene oxide units of the polyoxyalkylene moiety of the organosilicone surfactant is greater than 40 mole % based on the total number of ethylene oxide and propylene oxide units in said polyoxyalkylene moiety.

12 Claims, 3 Drawing Figures

PROCESS FOR PREPARING SMOKE-RETARDANT POLYISOCYANURATE FOAM

BACKGROUND OF THE INVENTION

1. Field of the Invention

The present invention relates to a process for preparing polyisocyanurate foam having properties of low smoke generation, low friability and does not burst (not scattered by contact with a flame) and which has excellent heat and flame-resistance.

2. Description of the Prior Arts

Polyisocyanurate foams can be prepared by mixing and stirring an organic polyisocyanate, an isocyanate-trimerization catalyst, a blowing agent, and if necessary a surfactant(Japanese Patent Publications Nos. 33910/1970 and 2269/1971).

The polyisocyanurate foams have excellent heat-resistance and flame-resistance caused by the isocyanurate linkage, but have the disadvantages of friability and bursting by contact with a flame and smoke-generation at the initial stage of contact with a flame.

In order to improve the disadvantages, processes for preparing various modified polyisocyanurate foams have been proposed, for example the use of a polyether as a modifier (Japanese Patent Publication Nos. 42386/1971 and 2269/1971); the use of a polyester as a modifier (Japanese Patent Publication No. 28919/1972) introduction of a polyoxazolidone linkage (Japanese Patent Publication No. 32800/1974); use of a polyol having a molecular weight of higher than 200 and a polyether diol having a molecular weight of lower than 200 as a modifier (Japanese Unexamined Patent Publication No. 101497/1973); use of a precondensate of xylene resin (Japanese Patent Publication No. 32757/1972); introduction of a polycarbodiimido linkage (Japanese Patent Publication No. 4591/1971); introduction of a urethane linkage and carbodiimide linkage (Japanese Patent Unexamined Publication No. 30796/1972). The modified polyisocyanurate foams have improved friability and bursting properties which are imparted by the modification, but still have the disadvantages of poor flame-resistance and flame-retardance and high smoke-generation. No process for preparing a polyisocyanurate foam having simultaneously five desirable characteristics of low-smoke-generation, low friability, high flame-resistance, high flame-retardance and high heat-resistance (dimensional stability under high temperature) has been proposed.

The inventors have studied a process for preparing a polyisocyanurate foam having said five characteristics.

SUMMARY OF THE INVENTION

It is an object of the present invention to provide a process for preparing a polyisocyanurate foam having low smoke-generation, low friability, high flame-resistance and high flame-retardance, high heat-resistance and which does not burst. The object of the present invention has been attained by reacting an organic polyisocyanurate in the presence of a blowing agent, an isocyanate trimerization catalyst, a surfactant and if necessary a modifier and other additive wherein the reaction is conducted by adding a specific organosilicone surfactant having a Si content of 4–22%, preferably 5–18% and selected from organopolysiloxane-polyoxyalkylene copolymers, polyvinylsilane having polyoxyalkylene side chain or modified products thereof wherein a mole % of EO (ethylene oxide unit of polyoxyalkylene moiety of the organosilicone surfactant) to PO (propylene oxide unit of the same) and EO, i.e. EO/EO+PO is equal to or greater than 40%, preferably equal to or greater than 50%, at a ratio of 0.5–6 wt. % as Si to the total components of the foam. Among the above defined organosilicone surfactant, those having polyoxyalkylene moiety composed of EO and no PO are more preferable.

DETAILED DESCRIPTION OF THE PREFERRED EMBODIMENTS

The specific organosilicone surfactants used in the present invention include organopolysiloxane-polyoxyalkylene copolymers, which are widely used as surfactants for urethane foams.

The manufacture, chemical structure and typical examples of the specific surfactants are disclosed in Japanese Patent Publication Nos.

| | | |
|---|---|---|
| 10543/1960 | 13344/1961 | 8850/1962 |
| 347/1963 | 6000/1963 | 7149/1963 |
| 1850/1964 | 20537/1964 | 24731/1964 |
| 12190/1965 | 2719/1967 | 3117/1967 |
| 3798/1967 | 4997/1967 | 11678/1967 |
| 13635/1967 | 16399/1968 | 17998/1968 |

The specific organosilicone surfactants used in the invention also include polymers of vinylsilane-polyalkylenepolyols which are disclosed in Japanese Patent Publication Nos. 12310/1965, 3559/1966, 5954/1966, 5955/1966, 3717/1968, 13758/1968 and 17999/1968.

In the process of the present invention, a large excess of the specific organosilicone surfactants are used compared with the amount of the specific organosilicone surfactant used in the conventional polyisocyanurate foams. The specific organosilicone surfactants are used at a ratio of 0.5–6 wt.% preferably 1.0–5 wt.% especially, 1.5–4 wt.% as Si to the total components of the foam.

Figure 2:
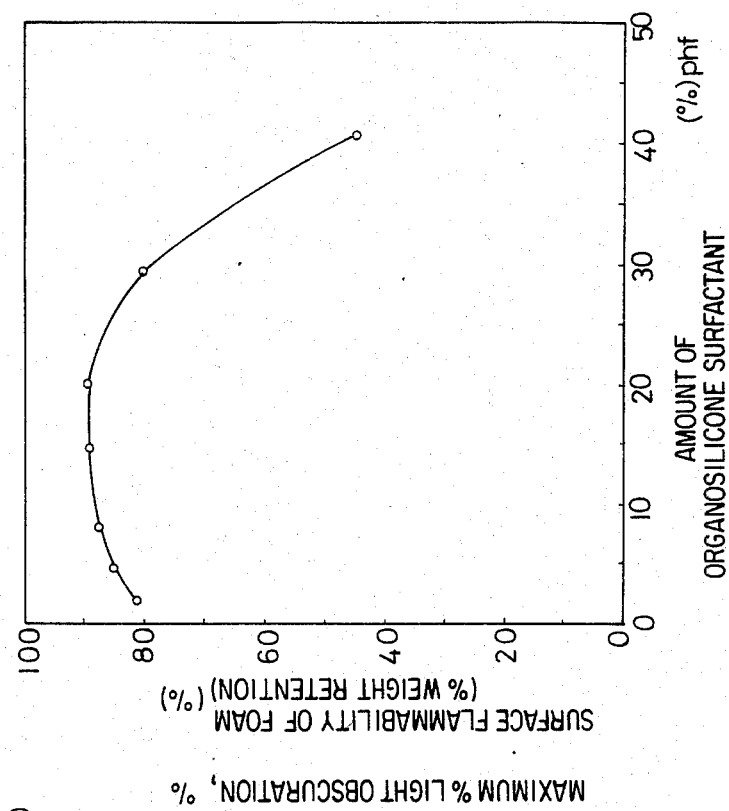
Figure 1:
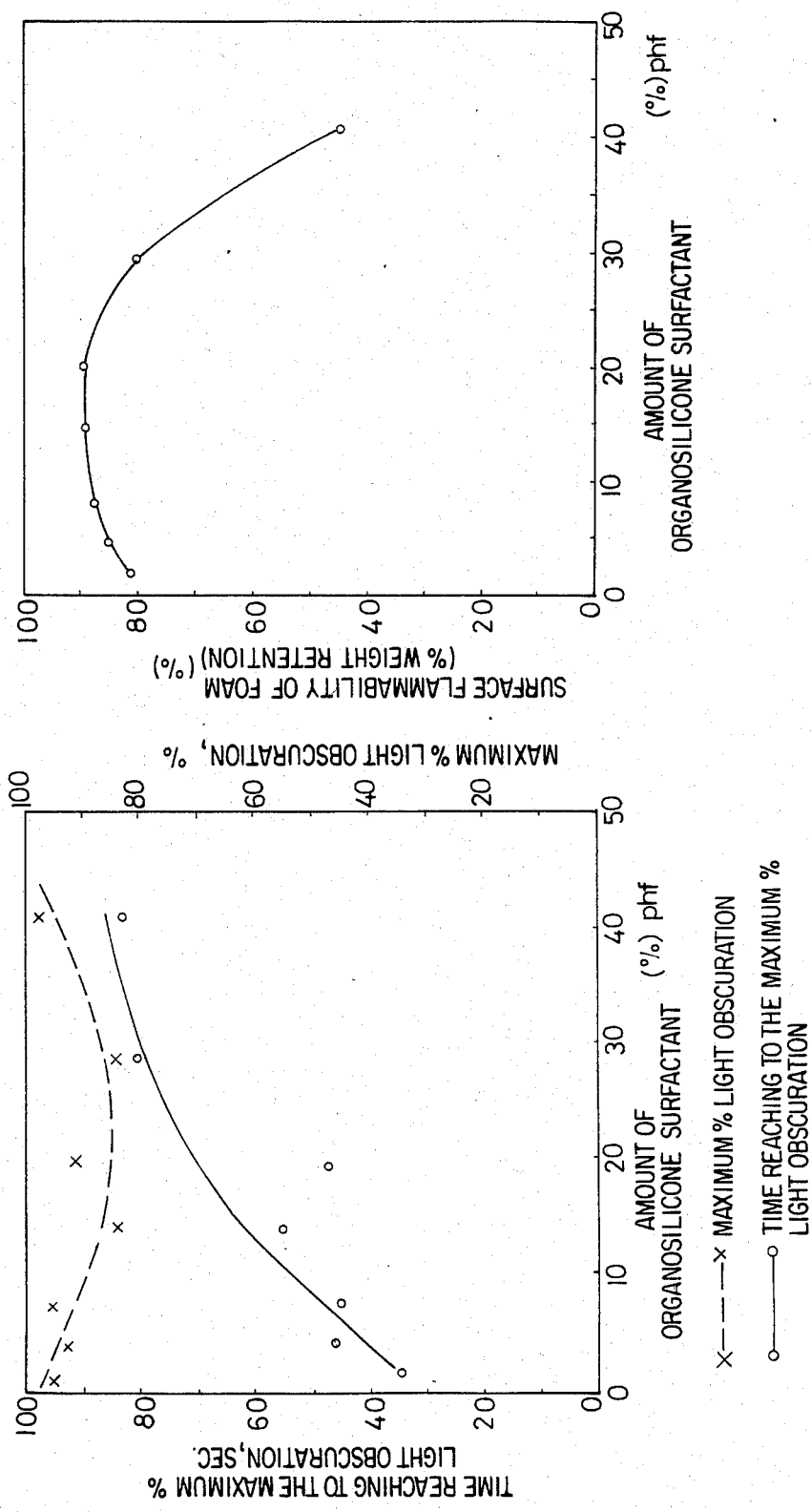
Figure 3:
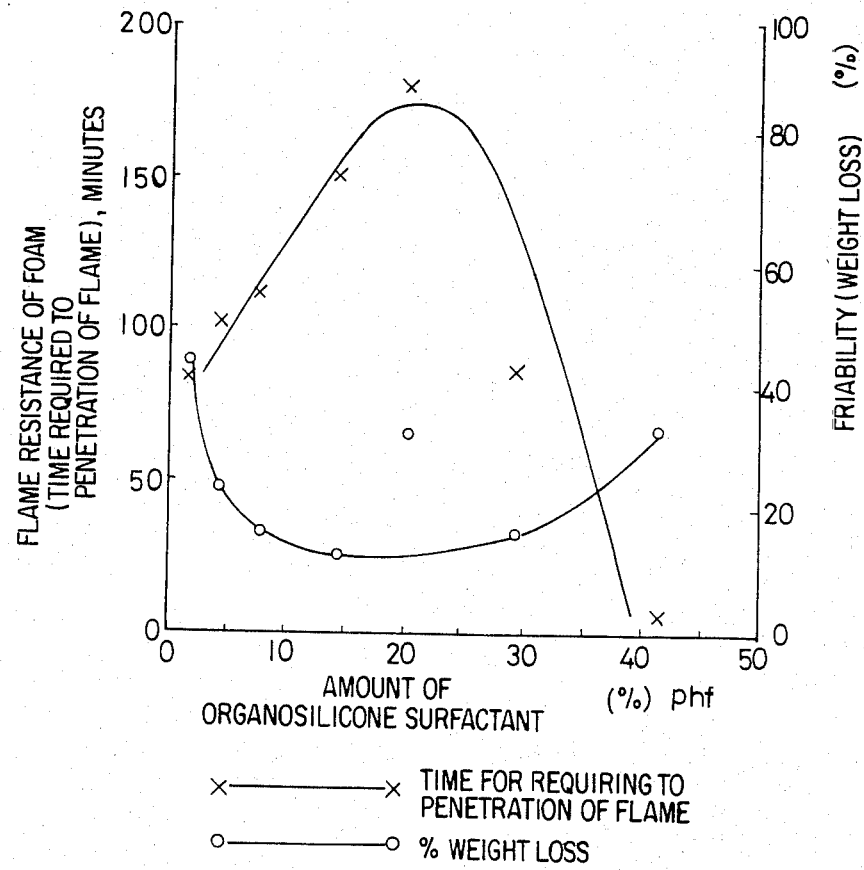

FIGS. 1–3 show the relationship of the amount of the specific organosilicone surfactant(Trade name SH-193 manufactured by Toray Silicone K K.) to smoke-generation, surface-flammability, flame-resistance and friability of the polyisocyanurate foams prepared by adding it. FIG. 1 shows the relation of the amounts of the specific organosilicone surfactant(wt. part to 100 wt. parts of the foam) to the smoke-generation of the foam.

The effect for suppression of smoke-generation is increased depending upon the increase of the amount of the specific organosilicone surfactant as shown that the time reaching to the maximum % light obscuration is increased.

FIG. 2 shows the relation of the amounts of the specific organosilicone surfactant to the surface flammability of the foam. The flame-retardance is decreased by adding more than 40 wt. % of the specific organosilicone surfactant. FIG. 3 shows the relationship of the amount of the specific organosilicone surfactant to the friability and flame-resistance of the foams.

With regard to the friability and flame-resistance of the foams, the optimum amounts of the specific organosilicone can be found. From the data of FIGS. 1 to 3, it is found that the amounts of the specific organosilicone surfactant to impart total desirable characteristics of low smoke-generation, surface flammability, flame-resistance and friability is in a range of 5–35 wt.%,(0.8–5.6 wt.% as Si) preferably 10–30 wt.%,(1.6–4.8 wt.% as Si) especially 15–25 wt.%(2.4–4 wt.% as Si) in the case of the organosilicone surfactant SH-193 (Si content=16%). In accordance with the process of the invention by adding more than 0.5 wt.% as Si of the specific organosilicone surfactant to the total components of the foam the unpredictable effect of preventing bursting can be attained together with the suppression of smoke generation. Although the friability and flame-resistance of the foams are slightly affected by the selection of the specific organosilicone surfactants, the suppression of smoke-generation, after flame property and the prevention of bursting of the foams are not affected by the selection of the specific organosilicone surfactants. Certain specific organosilicone surfactants impart remarkable effect for improving friability of the foam. The polyisocyanurate foams prepared by adding said large amount of the specific organosilicone surfactant according to the invention generates only slight white smoke by contact with a flame. The supression of smoke-generating is an unpredictable effect compared with the conventional unmodified and modified polyisocyanurate foams which generate black smoke upon contact with a flame.

The polyisocyanurate foam prepared according to the present invention has an excellent heat-resistance. Temperatures under which the conventional polyurethane foam and urethane-modified polyisocyanurate foam can maintain their dimensional stability are temperatures up to 80° C. and up to 150° C., respectively. On the other hand the polyisocyanurate foam prepared according to the process of this invention has dimensional stability at temperatures of up to 200° C.

In the process of the invention, the organic polyisocyanates are organic compounds having two or more NCO groups in one molecule and include aliphatic and aromatic polyisocyanate monomers, mixtures thereof and modified compounds thereof.

Typical aliphatic polyisocyanates include hexamethylenediisocyanate, isophoronediisocyanate, dicyclohexylmethanediisocyanate, methyl cyclohexanediisocyanate and the like. Typical aromatic polyisocyanates include tolylenediisocyanate(2,4- and/or 2,6-isomer), diphenylmethanediisocyanate, 3,3'-dimethyl-4,4'-biphenylene diisocyanate, naphthylenediisocyanate(such as 1,5-naphthylenediisocyanate), triphenylmethanetriisocyanate, dianisidinediisocyanate, xylylenediisocyanate, tri(isocyanatephenyl)thiophosphate, polynuclear polyisocyanate having the formula (I)

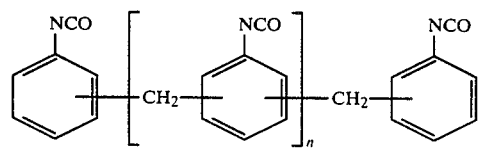

(wherein n is an integer of 0–10) (crude MDI or polymeric isocyanate) which is produced by reacting phosgene with a condensation product of aniline and formaldehyde; an undistilled tolylenediisocyanate and polyisocyanates having isocyanurate ring which are produced by reacting an organic dihalide with a metal salt of cyanic acid such as the compounds having the formula (II)

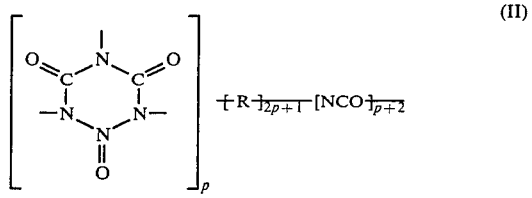

(wherein R is a divalent hydrocarbon group and p is an integer of 1–6) (Referring to Japanese Unexamined Patent Publication No. 51396/1974; Japanese Patent Publication Nos. 31998/1973; 7269/1972; and 8309/1971). In the process of the invention, it is possible to use modified products of the polyisocyanate monomers; such as the polyisocyanates having a linkage of biuret, allophanate, isocyanurate, carbodiimide, oxazolidone, amide, imide etc. which are produced by modifying said polyisocyanates. (Referring to Japanese Publication Nos 880/1973; 5636/1974 and 32800/1974 and Japanese Unexamined Patent Publication No. 197/1971.)

The modified polyisocyanates also include prepolymers having terminal NCO groups produced by reacting a polyol with equivalent or excess of polyisocyanate; such as polyisocyanates having urethane linkage which are produced by reacting trimethylolpropane with tolylenediisocyanate at a molar ratio of 1:3 or more; and prepolymers produced by reacting a small amount of a polyether polyol(sucrose propylene oxides adduct) with a polymeric isocyanate in the conventional process.

The organic polyisocyanates which are preferably used in the process of the invention are aromatic polyisocyanates especially the polyisocyanates having the formula (I) or (II) and modified products thereof. The optimum organic polyisocyanates are the polymeric isocyanates having the formula (I) and the modified products thereof. The blowing agents used in the process of the invention can be the conventional blowing agents used for the preparation of urethane foam and isocyanurate foam. Typical blowing agents include (a) inert solvents having a low boiling point such as trichloro-monofluoromethane, dichlorodifluoromethane, dibromotetrafluoroethane, trichlorotrifluoroethane, methylenechloride, pentane, trichloroethane, benzene, n-hexane and the like; (b) compounds which generate carbon dioxide by reacting with an isocyanate such as water, hydrated water containing compounds, nitroalkanes, aldoximes, acid amides, enolizable compounds and the like; (c) compounds which generate gas by a thermal decomposition by the heat of reaction provided in the formation of the foam such as sodium bicarbonate, ammonium bicarbonate, azobisisobutyronitrile, azoaminobenzol, dinitrosopentamethylene-tetramine and the like. The preferable blowing agents are the compounds included in the group (a) and the optimum blowing agent is trichloromonofluoromethane.

The isocyanate-trimerization catalysts used in the process of the invention can be compounds which have a catalytic activity for trimerizing isocyanate groups. It is preferable to use a catalyst which has high activity for accelerating trimerization since the reaction for preparing the foam is usually initiated at room temperature and is preferably completed within a short time such as 1–5 minutes. The isocyanate-trimerization catalysts by which the polyisocyanate is solidified at 100° C. within 10 minutes are preferably used.

These catalysts are disclosed in Japanese Patent Publication Nos. 2799/1960; 5838/1965; 16669/1969; 13257/1971; 15298/1971; 25017/1971; 31531/1971; 33577/1971; 37503/1971; 41393/1971; 41610/1971; 36038/1972; 35720/1973; Japanese Unexamined Patent Publication Nos. 29491/1972; 49898/1973; and 81996/1973.

Typical isocyanate-trimerization catalysts include (a) tertiary amines such as triethylamine, N, N', N''-tris(-dimethylaminopropyl)hexahydro-s-triazine, 2,4,6-tris(-dimethylaminomethyl)phenol, tetramethyl ethylenediamine, diazabicyclo-alkane (e.g. DABCO), mannich bases produced by the reaction of formaldehyde, dimethylamine and phenol or phenol having an alkyl substituent, cycloamidines and the like; (b) mixtures of the tertiary amine and a co-catalyst, such as ethanol, mono-N-substituted carbamic acid esters, water, aliphatic aldehydes, tertiary imines, benzoyl peroxide, ethylenecarbonate, α-diketones (e.g. diacetyl) and various epoxy compounds; (c) tertiary phosphines such as triethyl phosphine; (d) alkali metal salts of imides such as potassium phthalimide, sodium succinimide and the like; (e) organic onium compounds such as tetraethyl ammonium hydroxide, benzyl triethylammonium hydroxide, tetraethyl phosphonium hydroxide, trimethyl sulfonium hydroxide, (quaternary hydroxides having N,P,S, As or Sb) and the compound having the formula (III)

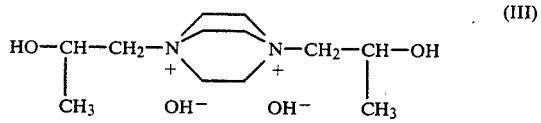

(f) ethyleneimines such as N-butyl ethyleneimine, 2-hydroxyethyl ethyleneimine and the like; (g) metal salts of carboxylic acid such as potassium acetate, potassium 2-ethylhexanoate, lead 2-ethylhexanoate, sodium benzoate, potassium naphthenate, tin octanoate and the like; (h) basic inorganic compounds such as potassium carbonate, calcium hydroxide, barium oxide, potassium hydroxide, sodium hydroxide and the like; (i) alcolates and phenolates such as sodium methoxide, potassium phenolate, sodium trichlorophenolate and the like; (j) Ti- and Sb-compounds such as tetra-butyl titanate, tri-n-butyl antimonyoxide and the like; (k) Friedel-Crafts catalysts such as zinc chloride, tin chloride, ferric chloride, antimony pentachloride, aluminum chloride, borotrifluoride and the like; (l) alkali metal complexes such as alkali metal complexes of salicylaldehyde, acetylacetone, o-hydroxacetophenone or quinizarine; alkali metal complexes of tetra-valent boron compounds e.g. $[(R^1O)_3BOR^2]^-M^+$ (M: an alkali metal; $R^1$ and $R^2$: mono-valent organic group) and the like.

It is now always necessary to add the other surfactant in the process of the invention as large amount of the organosilicone surfactant is added as a smoke-generation inhibitor. However it is possible to add nonionic surfactants, anionic surfactants and cationic surfactants. It is also possible to use the other additives if desirable. Typical additives include flame-retardants such as phosphorus or halogen-containing organic compounds, halogen-containing resins, antimony oxide, zinc oxide, aluminum hydroxide and the like; coloring agents such as pigments and dyes and inorganic fillers such as talc, diatomaceous earth, graphite; glass fiber and other inorganic fillers.

Typical process for preparing polyisocyanurate foam can be classified as follows.

(a) An organic polyisocyanate is admixed with a trimerization catalyst, a blowing agent and a surfactant and the mixture is foamed.

(b) A modified polyisocyanurate foam is prepared either by blending a modified polyisocyanate produced by reacting a polynuclear polyisocyanate with a modifier a trimerization catalyst, a blowing agent, a surfactant and etc. (prepolymer process) or by blending and foaming an unmodified polynuclear polyisocyanate, a modifier, a trimerization catalyst, a blowing agent, a surfactant, etc. at the same time (one shot process).

(c) A polyol having an isocyanurate ring, a polyisocyanate, a blowing agent, a surfactant and a urethane-forming catalyst are blended and foamed. It is possible to select the desirable one from the processes (a), (b) and (c). In order to attain the object of the invention, it is preferable to select the process (a) reacting a polyisocyanate without a modifier or the process (b) reacting a polyisocyanate modified by a small amount of the modifier. The process (a) is the optimum process. The polyisocyanurate foam prepared by the process (c) has relatively inferior heat-resistance and flame-resistance and smoke-generation in comparison with the process (a) and (b).

The modifiers for preparing the modified polyisocyanates used in the process (b) include polyether polyols, polyester polyols, polyepoxides, polyesteramides, polyamines, polycarboxylic acids, liquid dienepolymers having terminal hydroxyl groups, oil and fats having a hydroxyl group and phenol resin prepolymers(novolak and resol).

In the modification, the modifier is added at more than 3 preferably 5–20 of equivalent ratio of NCO group to the modifier. The process for preparing polyisocyanurate foams by using modifiers of polyethers is disclosed in Japanese Patent Publication No. 42386/1971. The process of preparing polyisocyanurate foams by using modifiers of polyesters is disclosed in Japanese Patent Publication No. 28919/1972.

The process for preparing polyisocyanurate foams by using modifiers of polycarboxylic acid or anhydrides thereof is disclosed in Japanese Patent Publication No. 42386/1971. Japanese Patents related to processes for preparing modified polyisocyanurate foams and isocyanate-trimerization catalysts are disclosed in "Plastic Material" Volume 16 No. 1 page 56 (1975).

Certain specific Examples are provided herein for purposes of illustration only and are not intended to be limiting in any manner unless otherwise specified. The evaluations of the polyisocyanurate foams were made in accordance with the following methods.

SMOKE-GENERATION

In accordance with ASTM D 2843-70. (XP-2 smoke-chamber test), a test piece having a size of $50^{mm} \times 50^{mm} \times 50^{mm}$ was burnt in a box and a concentration of smoke generated in the box is shown by a % light obscuration. The maximum % light obscuration and the time for reaching to the maximum % light obscuration are measured. The lower maximum % light obscuration and the longer time for reaching to the maximum % light obscuration indicate lower smoke-generation.

FLAME-RESISTANCE

In accordance with Bureau of Mines, Report of investigation No. 6366 (1964), the time for requiring to penetrating the sharp flame through a test piece is measured. The longer the flame penetration time indicates higher flame resistance.

SURFACE FLAMMABILITY

In accordance with Butler Chimney Test (Krueger O. A. Jr. et al. J. Cellular Plastics, Vol. 3, page 497 (1967), the surface flammability is shown by % weight retention.

The higher value indicates lower flammability. A test piece having a size of $18.75^{mm} \times 18.75^{mm} \times 100^{mm}$ is used. Accordingly, the data give about 10% smaller values than those of the test pieces having a normal length of 250 mm.

FRIABILITY

In accordance with ASTM C-421, a friability is measured after 10 minutes operation as % weight loss.

The lower value indicates lower friability.

DIMENSIONAL STABILITY UNDER HIGH TEMPERATURE

In accordance with ASTM D2126-66G, a test piece having a size of 50 mm × 50 mm × 50 mm was heated in an oven kept at 200° C. for 6 days. After cooling, change in dimensions of the test piece was measured.

|| means change in parallel direction to rise (of foam).

⊥ means change in perpendicular direction to rise (of foam).

EXAMPLES 1-3

Each of polyisocyanurate foams was prepared by using the following components shown in Table 1. Polymeric isocyanate (Trade name: Isonate 580 having 140 of NCO equivalent; manufactured by Upjon Co.); Silicone surfactant (Trade name: SH-193 (EO/EO+-PO=100%, Si content=16%) manufactured by Toray Silicone Co. Ltd.); Silicone surfactant (Trade name: L-5340 (EO/EO+PO=80%, Si content=17%) and L-5310 (EO/EO+PO=100%, Si content=17%) manufactured by Union Carbide Co.); Trimerization catalyst: N, N', N''-tris (dimethylaminopropyl)hexahydro-sym-triazine (hereinafter referring to as HHT); 30% Ethyleneglycol solution of potassium acetate. (hereinafter referring to as CH₃COOK/EG); Blowing agent of trichloromonofluoromethane. The characteristics of the foams are shown in Table 1. In the Table 1, the amounts of the components are weight parts.

TABLE 1

|  | Example No. | | |
|---|---|---|---|
|  | Exp. 1 | Exp. 2 | Exp. 3 |
| Composition |  |  |  |
| Polymeric isocyanate | 300 | 300 | 300 |
| Silicone surfactant |  |  |  |
| SH-193 | 0 | 0 | 90 |
| L-5340 | 90 | 0 | 0 |
| L-5310 | 0 | 90 | 0 |
| Trimerization catalyst |  |  |  |
| HHT | 2.5 | 2.0 | 2.0 |
| CH₃COOK/EG | 5.0 | 4.0 | 4.0 |
| Blowing agent CCl₃F | 60 | 60 | 60 |
| Si/foam (wt. %) | 3.3 | 3.4 | 3.2 |
| Conditions for foaming |  |  |  |
| Equivalent ratio* NCO/OH | 13 | 16 | 16 |
| Temperature of the mixture (°C.) | 22 | 22 | 22 |
| Cream time (sec.) | 13 | 12 | 12 |
| Rise time (sec.) | 60 | 80 | 55 |
| Characteristics: |  |  |  |
| Density (g/cm³) | 0.030 | 0.030 | 0.030 |
| Smoke-generation |  |  |  |
| (a) maximum % light obscuration (%) | 94 | — | 92 |
| (b) time for reaching to maximum % light obscuration (second) | 50 | — | 59 |
| Flame-resistance |  |  |  |
| flame penetration time (minute) | 95 | 65 | 180 |
| After-flame time (second) | 0 | 0 | 0 |
| Surface flammability: |  |  |  |
| % weight retention (%) | 85 | 82 | 89 |
| Friability: |  |  |  |
| % weight loss (%) | 74 | 87 | 32 |
| Dimensional stability at 200° C. for 6 days change in dimensions (%) | ‖ −0.9 ⊥ −0.5 | −0.7 −0.4 | −0.6 −0.7 |
| Bursting property: | none | none | none |

*OH group of SH-193 is not considered.

EXAMPLES 4-9

Each of polyisocyanurate foams were prepared by using various amounts of the silicone surfactant (SH-193). The components used in the preparations and the characteristics of foams are shown in Table 2. In the Table 2, the amounts of the components are weight parts.

TABLE 2

|  | Example No. | | | | | |
|---|---|---|---|---|---|---|
|  | Exp. 4 | Exp. 5 | Exp. 6 | Exp. 7 | Exp. 8 | Exp. 9 |
| Composition |  |  |  |  |  |  |
| Polymeric isocyanate Isonate-580 | 100 | 100 | 100 | 100 | 100 | 100 |
| Blowing agent CCl₃F | 20 | 20 | 20 | 20 | 23 | 25 |
| Silicone surfactant SH-193 | 5 | 10 | 20 | 30 | 50 | 90 |
| Trimerization catalyst HHT | 1 | 1 | 1 | 1 | 1 | 1 |
| CH₃COOK/EG | 2 | 2 | 2 | 2 | 2 | 2 |
| Si/foam (wt. %) | 0.63 | 1.2 | 2.2 | 3.1 | 4.5 | 6.6 |
| Conditions for foaming |  |  |  |  |  |  |
| Equivalent ratio* NCO/OH | 16 | 16 | 16 | 16 | 16 | 16 |
| Temperature of the mixture (°C.) | 23 | 23 | 22 | 23 | 23 | 23 |
| Cream time (sec) | 10 | 11 | 12 | 10 | 11 | 11 |
| Rise time (sec) | 35 | 35 | 35 | 35 | 30 | 32 |

TABLE 2-continued

|  | Example No. | | | | | |
| --- | --- | --- | --- | --- | --- | --- |
|  | Exp. 4 | Exp. 5 | Exp. 6 | Exp. 7 | Exp. 8 | Exp. 9 |
| Characteristics |  |  |  |  |  |  |
| Density (g/cm³) | 0.037 | 0.036 | 0.038 | 0.030 | 0.035 | 0.046 |
| Smoke-generation |  |  |  |  |  |  |
| (a) maximum % light obscuration (%) | 93 | 96 | 83 | 92 | 83 | 98 |
| (b) time for reaching to maximum % light obscuration (second) | 46 | 44 | 55 | 46 | 80 | 82 |
| Flame-resistance |  |  |  |  |  |  |
| Flame penetration time (minute) | 100 | 110 | 150 | 180 | 85 | 3 |
| After-flame time (second) | 0 | 0 | 0 | 0 | 0.5 | 50 |
| Surface flammability |  |  |  |  |  |  |
| % weight retention (%) | 85 | 87 | 88 | 89 | 79 | 44 |
| Friability |  |  |  |  |  |  |
| % weight loss (%) | 23 | 16 | 12 | 32 | 16 | 33 |
| Dimensional stability at 200° C. for 6 days change in dimensions (%) | ‖ −0.7<br>⊥ 1.5 | −0.7<br>−0.4 | −0.6<br>−0.7 | −0.6<br>−0.7 | −5.5<br>−5.8 | −12.6<br>−12.5 |
| Bursting property | none | none | none | none | none | none |

OH group of SI-193 is not considered.

EXAMPLES 10-14

Each of polyisocyanurate foams was prepared by using various kinds of the silicone surfactants. The components used in the preparations and the characteristics of the foams are shown in Table 3. In the Table 3, the amounts of the components are weight parts.

TABLE 3

|  | Example No. | | | | |
| --- | --- | --- | --- | --- | --- |
|  | 10 | 11 | 12 | 13 | 14 |
| Composition |  |  |  |  |  |
| Isonate 580 | 100 | 100 | 100 | 100 | 100 |
| L-5420*¹ | 20 |  |  |  |  |
| L-5303*² |  | 20 |  |  |  |
| L-5305*³ |  |  | 20 |  |  |
| SH-195*⁴ |  |  |  | 20 |  |
| XFA4251*⁵ |  |  |  |  | 20 |
| HHT | 1 | 1 | 1 | 1 | 1 |
| CH₃COOK/EG | 2 | 2 | 2 | 2 | 2 |
| CCl₃F | 20 | 20 | 20 | 20 | 20 |
| Si/foam (wt. %) | 2.4 | 0.8 | 0.8 | 2.4 | — |
| Conditions for foaming |  |  |  |  |  |
| Temperature of the mixture (°C.) | 16 | 17 | 17 | 17 | 18 |
| Cream time (sec.) | 9 | 15 | 18 | 15 | 17 |
| Rise time (sec.) | 40 | 70 | 40 | 50 | 20 |
| Characteristics |  |  |  |  |  |
| Density (g/cm³) | 0.039 | 0.035 | 0.039 | 0.036 | 0.036 |
| Smoke-generation |  |  |  |  |  |
| (a) maximum % light obscuration (%) | 92.5 | 96 | 90 | 92 | 87.5 |
| (b) time for reaching to maximum % light obscuration (sec.) | 78 | 37 | 69 | 62.3 | 60 |
| Flame-resistance |  |  |  |  |  |
| flame penetration time (min.) | 103 | 75 | 57 | 87 | 135 |
| After-flame time (sec.) | 0 | 0 | 0 | 0.4 | 0 |
| Surface flammability |  |  |  |  |  |
| % weight retention (%) | 83.8 | 75.4 | 81.9 | 81.6 | 85.0 |
| Friability |  |  |  |  |  |
| % weight loss (%) | 78.2 | 33.7 | 26.5 | 13.0 | 14.3 |

TABLE 3-continued

|  | Example No. | | | | |
| --- | --- | --- | --- | --- | --- |
|  | 10 | 11 | 12 | 13 | 14 |
| Bursting property | none | none | none | none | none |

*¹-*³Silicone surfactant, Trade name, manufactured by Union Carbide Co.
L-5420: EO/EO + PO = 100%, Si content = 17%
L-5303: EO/EO + PO = 30%, Si content = 5.7%
L-5305: EO/EO + PO = 56%, Si content = 5.7%
*⁴Silicone surfactant, Trade name, manufactured by Toray Silicone Co. Ltd.
SH-195: EO/EO + PO = 100%, Si content = 17%
*⁵Silicone surfactant, Trade name, manufactured by Shinetsu Kagaku K.K.
XFA4251: EO/EO + PO = 54%.

We claim:

1. A process for preparing a smoke retardant polyisocyanurate foam, which comprises: reacting an organic polyisocyanate in the presence of a blowing agent, an isocyanate trimerization catalyst and an amount of an organosilicone surfactant having a silicon content of from 4–22% such that the silicon content of the foam product ranges from 1.5% to 5%, and selected from the group consisting of an organopolysiloxanepolyoxyalkylene copolymer, a polyvinyl silane having a polyoxyalkylene side chain and modified products thereof wherein the mole % of the ethylene oxide units of the polyoxyalkylene moiety of the organosilicone surfactant is greater than 40 mole % based on the total number of ethylene oxide and propylene oxide units in said polyoxyalkylene moiety.

2. The process of claim 1, wherein the organosilicone surfactant having the mole % of ethylene oxide units in the polyoxyalkylene moiety of the surfactant is 100% based on the total ethylene oxide and propylene oxide units in said moiety.

3. The process of claim 1, wherein a polyisocyanate which is produced by reacting phosgene with a condensation product of aniline and formaldehyde is used as an organic polyisocyanate.

4. The process of claim 1, wherein said polyisocyanate is hexamethylenediisocyanate, isophoronediisocyanate, dicyclohexylmethanediisocyanate, methyl cyclohexanediisocyanate, tolylenediisocyanate(2, 4- and-/or 2,6-isomer), diphenylmethanediisocyanate, 3,3'dimethyl-4,4'-biphenylene diisocyanate, naphthylenediisocyanate, triphenylmethanetriisocyanate, dianisidinediisocyanate, xylylenediisocyanate, tris-(isocyonatophenyl)thiophosphate, a polynuclear polyisocyanate having the formula:

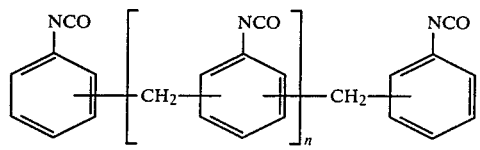

wherein n is an integer of 0–10, crude MDI which is prepared by reacting phosgene with a condensation product of aniline and formaldehyde, undistilled tolylenediisocyanate or a polyisocyanate having an isocyanurate ring which is prepared by reacting an organic dihalide with a metal salt of cyanic acid and having the formula:

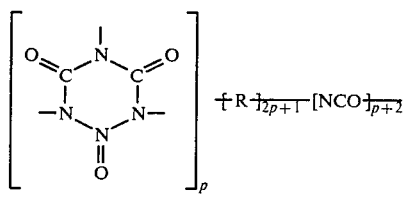

wherein R is a divalent hydrocarbon group and p is an integer of 1–6.

5. The process of claim 1, wherein said blowing agent in trichloromonofluoromethane, dichlorodifluoromethane, dibromotetrafluoroethane, trichlorotrifluoroethane, methylenechloride, pentane, trichloroethane, benzene or n-hexane.

6. The process of claim 1, wherein said blowing agent is trichloromonofluoromethane.

7. A polyisocyanurate foam which contains an amount of an organosilicone surfactant having a silicon content of from 4–22% such that the silicon content of the foam product ranges from 1.5% to 5%, and selected from the group consisting of an organopolysiloxanepolyoxyalkylene copolymer, a polyvinylsilane having a polyoxyalkylene side chain and modified products thereof wherein the mole % of ethylene oxide units in said polyoxyalkylene side chain is greater than 40 mole % based on the total ethylene oxide and propylene oxide units in said chain.

8. The polyisocyanurate foam of claim 7, wherein the ratio of Si to the total components of the foam is 1.5 to 4 wt. %.

9. The polyisocyanurate foam of claim 7, wherein the mole percent of ethylene oxide units in relation to the total number of moles of ethylene oxide and propylene oxide units in said organosilicone surfactant is at least equal to 50%.

10. The polyisocyanurate foam of claim 7, wherein the organosilicone surfactant contains 100 mole % ethylene oxide units based on the total amount of ethylene oxide and propylene oxide units.

11. A method for increasing the smoke retardant properties of polyisocyanurate foam, comprising:
incorporating an organosilicone surfactant having a silicon content of from 4–22% in a polyisocyanurate foam in an amount such that the silicon contant in the product foam ranges from 1.5% to 5%, said organosilicone surfactant being selected from the group consisting of an organopolysiloxane-polyoxyalkylene polymer, a polyvinylsilane having a polyoxyalkylene side chain and modified products thereof, wherein the mole % of the ethylene oxide units of the polyoxyalkylene moiety of the organosilicone surfactant is greater than 40 mole % based on the total number of ethylene oxide and propylene oxide units in said polyoxyalkylene moiety.

12. A polyisocyanurate foam which contains an amount of an organosilicone surfactant such that the silicon content of the foam product ranges from 1.5% to 5%, said organosilicone surfactant being a silicone surfactant having a silicon content of 17% and having an ethylene oxide to ethylene oxide and propylene oxide ratio of 80% or a silicone surfactant having a silicon content of 16% or 17% and having an ethylene oxide to ethylene oxide and propylene oxide ratio of 100%.

* * * * *